(12) United States Patent
Kim

(10) Patent No.: US 11,845,413 B2
(45) Date of Patent: Dec. 19, 2023

(54) ELECTRIC BRAKE DEVICE

(71) Applicant: HYUNDAI MOBIS CO., LTD., Seoul (KR)

(72) Inventor: Hyeong Sik Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 206 days.

(21) Appl. No.: 17/391,344

(22) Filed: Aug. 2, 2021

(65) Prior Publication Data

US 2022/0041151 A1    Feb. 10, 2022

(30) Foreign Application Priority Data

Aug. 4, 2020 (KR) .................. 10-2020-0097328

(51) Int. Cl.
| | |
|---|---|
| *B60T 13/74* | (2006.01) |
| *F16D 65/18* | (2006.01) |
| *B60T 1/06* | (2006.01) |
| *F16D 121/24* | (2012.01) |
| *F16D 125/40* | (2012.01) |
| *F16D 127/02* | (2012.01) |

(52) U.S. Cl.
CPC ............ *B60T 13/746* (2013.01); *F16D 65/18* (2013.01); *B60T 1/065* (2013.01); *F16D 2121/24* (2013.01); *F16D 2125/40* (2013.01); *F16D 2127/02* (2013.01)

(58) Field of Classification Search
CPC ..................................................... B60T 13/741
See application file for complete search history.

(56) References Cited

U.S. PATENT DOCUMENTS

| | | | | |
|---|---|---|---|---|
| 8,844,683 | B2* | 9/2014 | Sternal .................... | B60T 7/122 |
| | | | | 188/72.6 |
| 2016/0273597 | A1* | 9/2016 | Patel ....................... | F16D 55/226 |
| 2018/0298969 | A1* | 10/2018 | Demorais ............. | F16D 55/226 |
| 2019/0277355 | A1* | 9/2019 | Kim ........................ | F16D 65/18 |
| 2020/0256414 | A1* | 8/2020 | Gerber ................... | F16D 65/38 |
| 2022/0025947 | A1* | 1/2022 | Baek ...................... | F16D 65/183 |
| 2022/0041151 | A1* | 2/2022 | Kim ........................ | F16D 55/224 |
| 2022/0389981 | A1* | 12/2022 | Leiter ..................... | F16D 65/18 |
| 2023/0123351 | A1* | 4/2023 | Baek ....................... | F16D 55/226 |
| | | | | 188/72.1 |
| 2023/0128238 | A1* | 4/2023 | Bertrand ................. | F16D 65/18 |
| | | | | 188/71.1 |

FOREIGN PATENT DOCUMENTS

| | | | | |
|---|---|---|---|---|
| CN | 109083948 A | * | 12/2018 | .......... F16D 55/225 |
| KR | 10-0994050 B1 | | 11/2010 | |
| KR | 20150137718 A | * | 12/2015 | .......... F16D 65/183 |

OTHER PUBLICATIONS

Machine translation of CN 109083948 (no date).*

* cited by examiner

*Primary Examiner* — Nicholas J Lane
(74) *Attorney, Agent, or Firm* — MORGAN, LEWIS & BOCKIUS LLP

(57) ABSTRACT

An electric brake device may include: a housing part; a driving part mounted on the housing part; a driving shaft part rotatable by the driving part; a nut part screwed to the driving shaft part, and linearly moveable through rotation of the driving shaft part; a piston part having the nut part inserted therein, and configured to move a pad through the nut part; and a return part mounted on the nut part, contacting the piston part, and configured to induce a return of the piston part.

9 Claims, 7 Drawing Sheets

ELECTRIC BRAKE DEVICE

CROSS-REFERENCE TO RELATED APPLICATION

This application claims priority from and the benefit of Korean Patent Application No. 10-2020-0097328, filed on Aug. 4, 2020, which is hereby incorporated by reference for all purposes as if set forth herein.

BACKGROUND

Field

Exemplary embodiments of the present disclosure relate to an electric brake device, and more particularly, to an electric brake device which can induce rapid restoration, and reduce noise and shock, when the brake is released.

Discussion of the Background

In general, an electric brake device includes a housing in which a part of a disk rotated with a wheel of a vehicle is formed, a pad provided on either side of the disk in the housing, and a piston configured to push the pad.

A nut is inserted into such a piston. When a motor is driven to linearly move the nut screwed to a motor shaft, the piston is pushed to press the pad.

In the related art, the nut maintains the state in which it is not coupled to the piston but inserted into the piston. Thus, when the nut is returned to the original position after being moved forward and pressed, the piston may not be rapidly restored. Therefore, there is a need for a device capable of solving the problem.

The related art of the present disclosure is disclosed in Korean Patent No. 10-0994050 registered on Nov. 5, 2010 and entitled "Electric Brake Device".

SUMMARY

Various embodiments are directed to an electric brake device which can induce rapid restoration, and reduce noise and shock, when the brake is released.

In an embodiment, an electric brake device may include: a housing part; a driving part mounted on the housing part; a driving shaft part rotatable by the driving part; a nut part screwed to the driving shaft part, and linearly moveable through rotation of the driving shaft part; a piston part having the nut part inserted therein, and configured to move a pad through the nut part; and a return part mounted on the nut part, contacting the piston part, and configured to induce a return of the piston part.

The nut part may include: a nut body screwed to the driving shaft part, and inserted into the piston part; and a nut head extending in an axial direction from an end of the nut body, and contacting the piston part.

The return part may include: a return fixed part mounted on the nut body; and one or more return contact parts extending from the return fixed part, bent to have elasticity, and contacting an inside of the piston part.

The piston part may include one ore more friction increasing parts formed therein and configured to increase a friction force with the one ore more return contact parts.

Each of the one ore more friction increasing parts may extends along a moving path of the return contact part.

The nut part may include a nut calibration part formed therein and configured to guide a mounting position of the return fixed part.

The return fixed part may include: a fixed ring part having a cut ring shape that surrounds the nut body; and a fixed coupling part extending from the fixed ring part, and coupled to the nut head.

The fixed ring part may press an outer surface of the nut body.

The fixed ring part may be inserted into a nut groove formed in an outer surface of the nut body.

The return fixed part may include: a fixed base part having a ring shape that surrounds the nut body; and one or more fixed pressing parts extending from an inner circumferential surface of the fixed base part, and contacting the nut body.

In the electric brake device in accordance with the embodiment of the present disclosure, the return part mounted on the nut part may be contacted with the piston part. Thus, when the nut part is returned, the return part may induce the rapid return of the piston part, and suppress shock and noise.

DETAILED DESCRIPTION OF THE ILLUSTRATED EMBODIMENTS

Hereinafter, an electric brake device will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
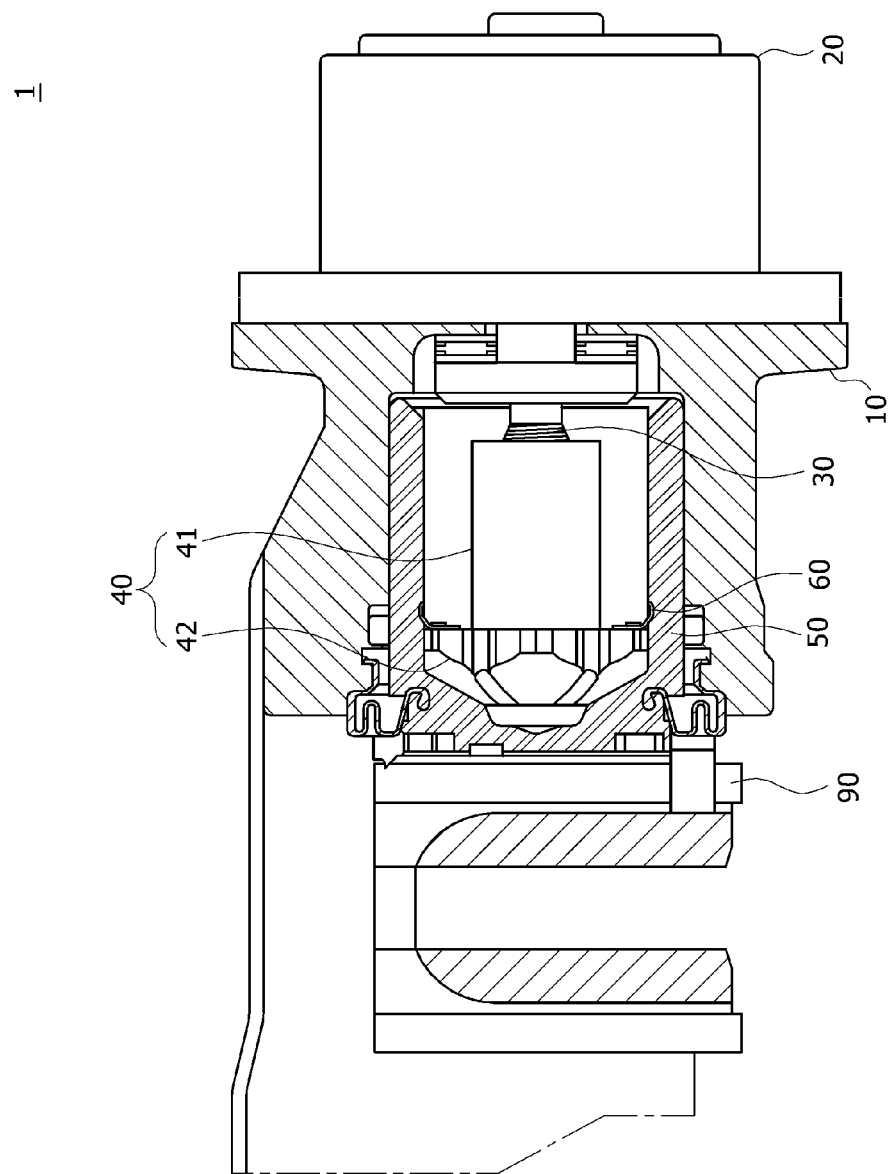
FIG. 1 is a diagram schematically illustrating an electric brake device in accordance with an embodiment of the present disclosure.

FIG. 1 is a diagram schematically illustrating an electric brake device 1 in accordance with an embodiment of the present disclosure. Referring to FIG. 1, the electric brake device 1 in accordance with the embodiment of the present disclosure includes a housing part 10, a driving part 20, a driving shaft part 30, a nut part 40, a piston part 50 and a return part 60.

The housing part 10 may be fixed to a vehicle body, the driving part 20 may be mounted on the housing part 10, and the driving shaft part 30 may be rotated by the driving part 20. For example, the driving part 20 may be driven when power is applied thereto, and the driving shaft part 30 may have a screw thread formed thereon.

The nut part 40 is screwed to the driving shaft part 30, and the driving shaft part 30 is rotated to linearly move the nut part 40. For example, the driving shaft part 30 may be screwed and inserted into the nut part 40. The housing part 10 may have a guide configured to limit the rotation of the nut part 40 such that the nut part 40 is linearly moved along the axis of the driving shaft part 30 by the rotation of the driving shaft part 30.

The nut part 40 is inserted into the piston part 50. When the piston part 50 is pushed by the nut part 40, a pad 90 is moved. Such a pad 90 may be pressed against a disk and provide a braking force. When hydraulic pressure is supplied through the housing part 10, the piston part 50 may be moved by the hydraulic pressure.

The return part 60 is mounted on the nut part 40, and contacts the piston part 50 so as to induce the return of the piston part 50. For example, when the nut part 40 is returned to the original position, the return part 60 may induce the return of the piston part 50 through fiction with the piston part 50. The piston part 50 may be moved by hydraulic pressure higher than the friction force between the return part 60 and the piston part 50.

The nut part 40 in accordance with the embodiment of the present disclosure includes a nut body 41 and a nut head 42.

The nut body 41 has a groove having a screw thread formed therein, such that the driving shaft part 30 is screwed to the nut body 41. The nut body 41 is inserted into the piston part 50. For example, the nut body 41 may be formed in a cylinder shape with a groove formed therein.

The nut head 42 extends laterally from an end of the nut body 41, and contacts the piston part 50. For example, the nut head 42 may have a groove formed at the edge thereof so as to be linearly moveable along the guide for limiting rotation. The nut head 42 may contact the inner surface of the piston part 50 so as to push the piston part 50.

Figure 2:
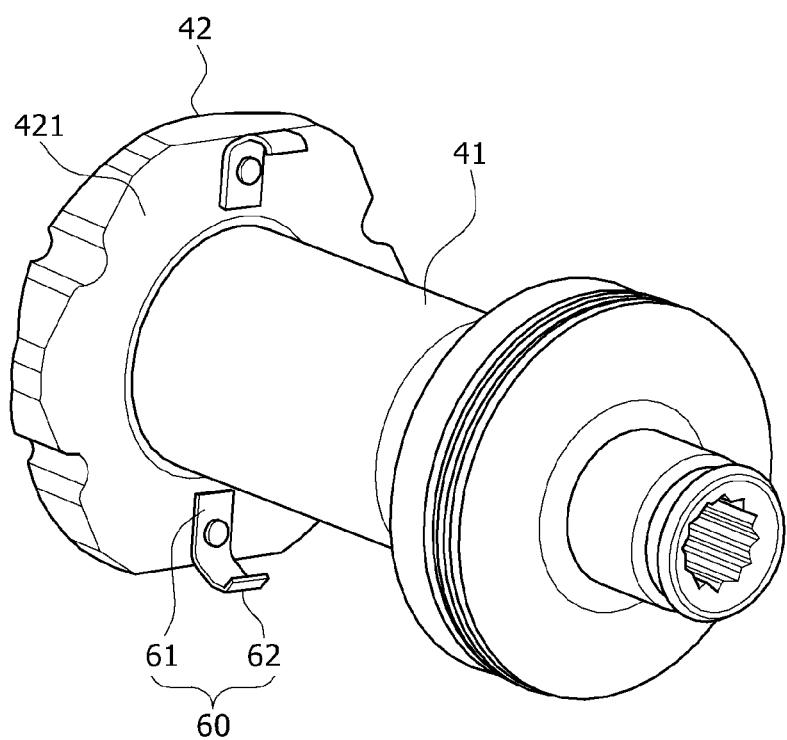
FIG. 2 is a diagram schematically illustrating a return part in accordance with the embodiment of the present disclosure.

FIG. 2 is a diagram schematically illustrating the return part in accordance with the embodiment of the present disclosure. Referring to FIG. 2, the return part 60 in accordance with the embodiment of the present disclosure includes a return fixed part 61 and a return contact part 62.

The return fixed part 61 is mounted on the nut part 40. For example, one or more return fixed parts 61 may be mounted on a mounting surface 421 of the nut head 42 in the circumferential direction thereof. The return fixed part 61 may be screwed or riveted to the mounting surface 421, and maintain the coupling state through various methods other than the screwing or riveting method.

The return contact part 62 extends from the return fixed part 61, is bent to have elasticity, and contacts the inside of the piston part 50. For example, the return contact part 62 may extend from an end of the return fixed part 61 beyond the outer diameter of the nut head 42. The return contact part 62 may be bent to have elasticity by itself, and contact the inner wall of the piston part 50.

Figure 3:
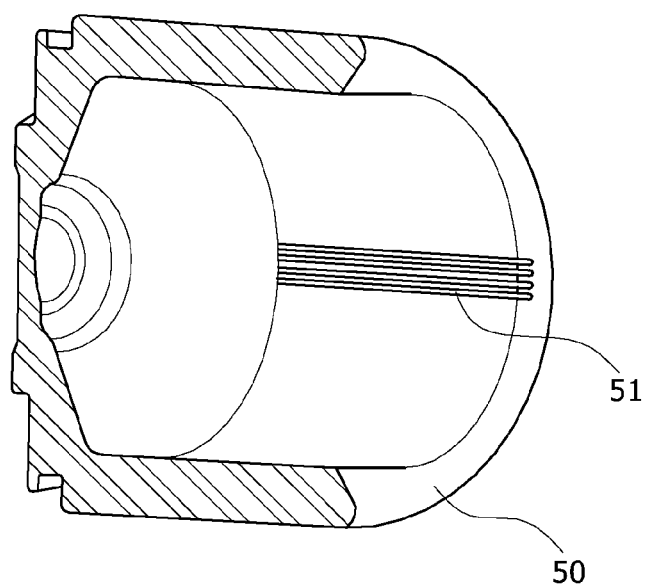
FIG. 3 is a diagram schematically illustrating a friction increasing part in accordance with the embodiment of the present disclosure.

FIG. 3 is a diagram schematically illustrating a friction increasing part in accordance with the embodiment of the present disclosure. Referring to FIG. 3, the piston part 50 includes a friction increasing part 51 formed therein and configured to increase the friction force with the return contact part 62.

More specifically, the friction increasing part 51 may be formed on the moving path of the return contact part 62. Such a friction increasing part 51 may increase the friction force while contacting the return contact part 62.

For example, the friction increasing part 51 may be formed in the longitudinal direction of a groove formed in the piston part 50. Such a friction increasing part 51 may be formed to extend along the moving path of the return contact part 62.

Figure 4:
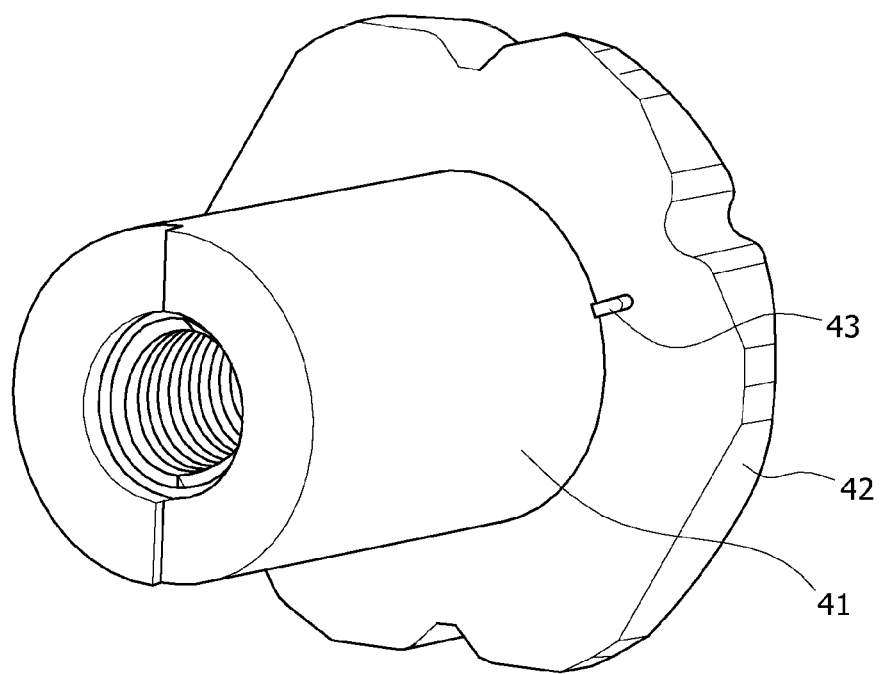
FIG. 4 is a diagram schematically illustrating a nut calibration part in accordance with the embodiment of the present disclosure.

FIG. 4 is a diagram schematically illustrating a nut calibration part in accordance with the embodiment of the present disclosure. Referring to FIG. 4, the nut part 40 includes a nut calibration part 43 configured to guide the mounting position of the return fixed part 61. For example, one or more nut calibration parts 43 may be formed along the outer circumferential surface of the nut body 41, and have a protrusion shape. The contact state between the return contact part 62 and the friction increasing part 51 may be maintained by the nut calibration part 43.

Figure 5:
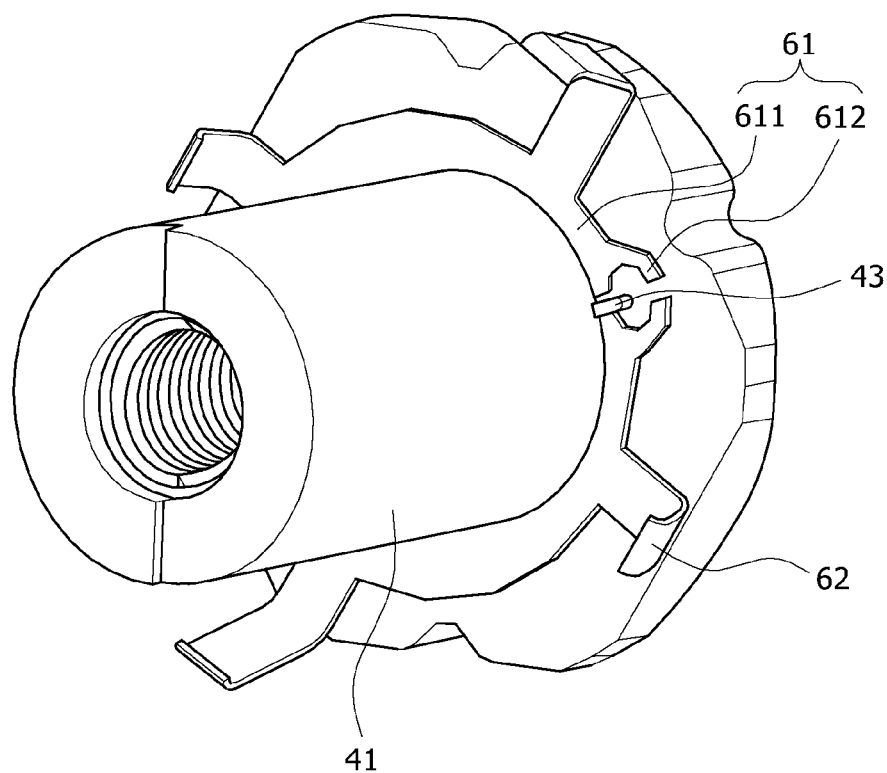
FIG. 5 is a diagram schematically illustrating a return fixed part in accordance with a first embodiment of the present disclosure.
Figure 6:
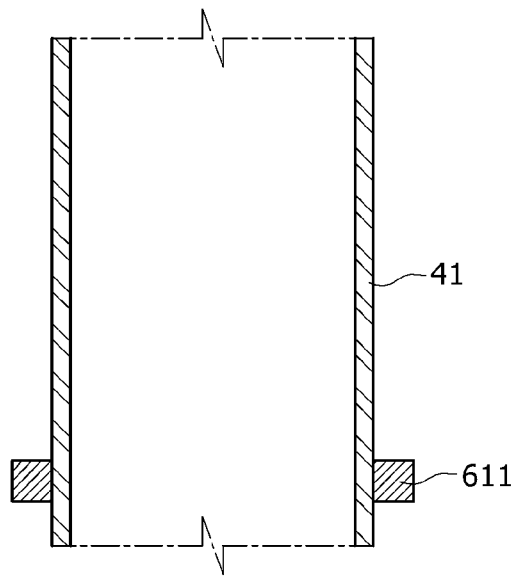
FIG. 6 is a diagram schematically illustrating that a fixed ring part in accordance with the first embodiment of the present disclosure presses a nut body.
Figure 7:
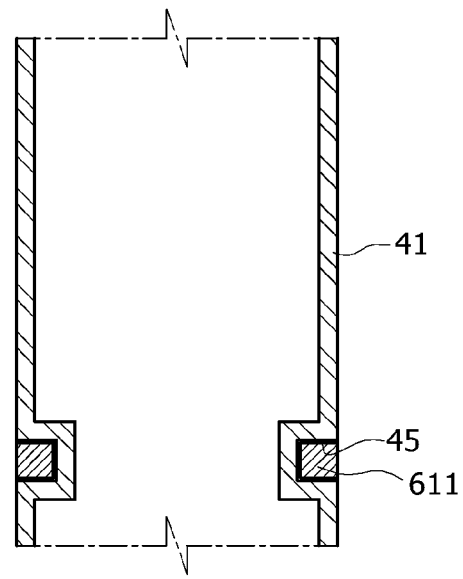
FIG. 7 is a diagram schematically illustrating that the fixed ring part in accordance with the first embodiment of the present disclosure is inserted into the nut body.

FIG. 5 is a diagram schematically illustrating a return fixed part in accordance with a first embodiment of the present disclosure, FIG. 6 is a diagram schematically illustrating that a fixed ring part in accordance with the first embodiment of the present disclosure presses the nut body, and FIG. 7 is a diagram schematically illustrating that the fixed ring part in accordance with the first embodiment of the present disclosure is inserted into the nut body. Referring to FIGS. 5 to 7, the return fixed part 61 in accordance with the first embodiment of the present disclosure includes a fixed ring part 611 and a fixed coupling part 612.

The fixed ring part 611 is formed in a cut ring shape to surround the nut body 41. For example, an operator spreads the fixed ring part 611 and then locates the fixed ring part 611 to surround the nut body 41. At this time, the nut calibration part 43 may be disposed between both ends of the fixed ring part 611. The fixed ring part 611 may press the outer circumferential surface of the nut body 41 or be inserted and locked to a nut groove 45 formed on the outer circumferential surface of the nut body 41.

The fixed coupling part 612 extends from the fixed ring part 611 and coupled to the nut head 42. For example, the fixed coupling part 612 may extend outward from the end or outer circumferential surface of the fixed ring part 611. Such a fixed coupling part 612 may be brought into surface contact with the mounting surface 421, and maintain the coupling state with the mounting surface 421 through the screw or rivet coupling.

Figure 8:
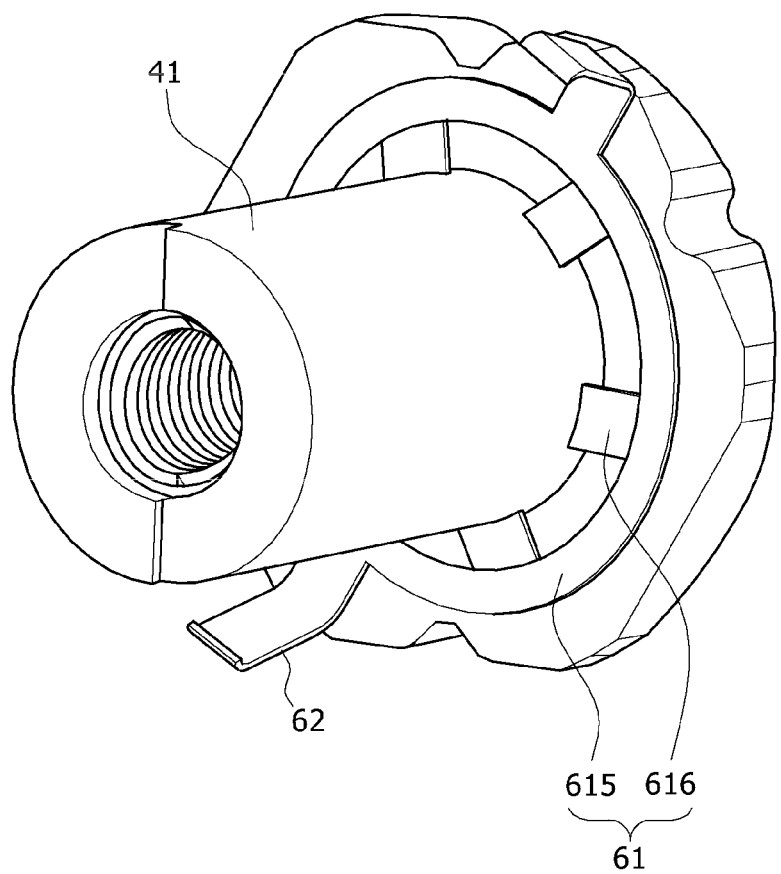
FIG. 8 is a diagram schematically illustrating a return fixed part in accordance with a second embodiment of the present disclosure.

FIG. 8 is a diagram schematically illustrating a return fixed part in accordance with a second embodiment of the present disclosure. Referring to FIG. 8, a return fixed part 61 in accordance with the second embodiment of the present disclosure includes a fixed base part 615 and a fixed pressing part 616.

The fixed base part 615 is formed in a ring shape to surround the nut body 41. For example, the fixed base part 615 may have an inner diameter larger than the outer diameter of the nut body 41, such that the nut body 41 can pass through the fixed base part 615.

One or more fixed pressing parts 616 may extend from the inner circumferential surface of the fixed base part 615, and contact the nut head 42. For example, the plurality of fixed pressing parts 616 may be formed along the inner circumferential surface of the fixed base part 615 while inclined to protrude, and contact the nut body 41. Such a fixed pressing part 616 may be inserted into the nut groove 45 of FIG. 7.

The operation of the electric brake device in accordance with the embodiment of the present disclosure, which has the above-described structure, will be described as follows.

The driving part 20 is mounted on the housing part 10, and the driving shaft part 30 formed in the driving part 20 is screwed to the nut part 40. The nut part 40 is inserted into the piston part 50. At this time, the piston part 50 is disposed to press the pad 90.

The return fixed part 61 is mounted on the nut part 40, and the return contact part 62 formed on the return fixed part 61 extends outward from the return fixed part 61 and contacts the inner wall of the piston part 50.

In the above-described state, when hydraulic pressure is supplied to the housing part 10, the piston part 50 presses the pad 90 while being pushed and moved by the hydraulic pressure. Then, when the hydraulic pressure is removed, the piston part 50 is returned to the original position by a restoring force of the pad 90 or a sealing member which is mounted on the housing part 10 and coupled to the piston part 50 so as to block an inflow of foreign matters.

When power is applied to the driving part 20, the driving shaft part 30 is rotated in one direction, and the nut part 40 screwed to the driving shaft part 30 is linearly moved toward the piston part 50 so as to push the piston part 50.

Thus, the piston part 50 is pushed and moved to press the pad 90. Then, when the driving shaft part 30 is rotated in the other direction, the nut part 40 screwed to the driving shaft part 30 is linearly moved in the opposite direction of the piston part 50.

At this time, when the return part 60 is coupled to the nut part 40 and contacts the piston part 50, the piston part 50 is rapidly returned to the original position with the return part 60 by the friction force between the return part 60 and the piston part 50.

Besides, when the plurality of return contact parts 62 are disposed along the circumference of the nut part 40, it is possible to prevent shock and noise caused by the movement of the nut part 40, and to maintain the operation performance in the optimal state.

In the electric brake device 1 in accordance with the embodiment of the present disclosure, the return part 60 mounted on the nut part 40 may contact the piston part 50. Thus, when the nut part 40 is returned, the return part 60 may induce the rapid return of the piston part 50, and suppress shock and noise.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An electric brake device comprising:
a housing part;
a driving part mounted on the housing part;
a driving shaft part rotatable by the driving part;
a nut part screwed to the driving shaft part, and linearly moveable through rotation of the driving shaft part,
the nut part comprising:
a nut body screwed to the driving shaft part, and inserted into the piston part;

a piston part having the nut part inserted therein, and configured to move a pad through the nut part; and
a return part mounted on the nut part, contacting the piston part, and configured to induce a return of the piston part,
the return part comprising:
a return fixed part mounted on the nut body comprising:
a fixed ring part having a cut ring shape that surrounds the nut body; and
a fixed coupling part extending from the fixed ring part, and coupled to a nut head of the nut part.

2. The electric brake device of claim 1, wherein the nut part comprises:
the nut head extending in an axial direction from an end of the nut body, and contacting the piston part.

3. The electric brake device of claim 2, wherein the return part comprises:
one or more return contact parts extending from the return fixed part, bent to have elasticity, and contacting an inside of the piston part.

4. The electric brake device of claim 3, wherein the piston part comprises one or more friction increasing parts formed therein and configured to increase a friction force with the one or more return contact parts.

5. The electric brake device of claim 4, wherein each of the one or more friction increasing parts extends along a moving path of the one or more return contact parts.

6. The electric brake device of claim 3, wherein the nut part comprises a nut calibration part formed therein and configured to guide a mounting position of the return fixed part.

7. The electric brake device of claim 1, wherein the fixed ring part is configured to press an outer surface of the nut body.

8. The electric brake device of claim 1, wherein the fixed ring part is inserted into a nut groove formed in an outer surface of the nut body.

9. An electric brake device comprising:
a housing part;
a driving part mounted on the housing part;
a driving shaft part rotatable by the driving part;
a nut part screwed to the driving shaft part, and linearly moveable through rotation of the driving shaft part,
the nut part comprising:
a nut body screwed to the driving shaft part, and inserted into the piston part; and
a nut head extending in an axial direction from an end of the nut body, and contacting the piston part;
a piston part having the nut part inserted therein, and configured to move a pad through the nut part; and
a return part mounted on the nut part, contacting the piston part, and configured to induce a return of the piston part,
the return part comprising:
a return fixed part mounted on the nut body; and
one or more return contact parts extending from the return fixed part, bent to have elasticity, and contacting an inside of the piston part,
the return fixed part comprising:
a fixed base part having a ring shape that surrounds the nut body; and
one or more fixed pressing parts extending from an inner circumferential surface of the fixed base part, and contacting the nut body.

* * * * *